May 5, 1931. T. DURMAN 1,803,322
AUTOMATIC FILM WINDING DEVICE
Filed Dec. 5, 1927
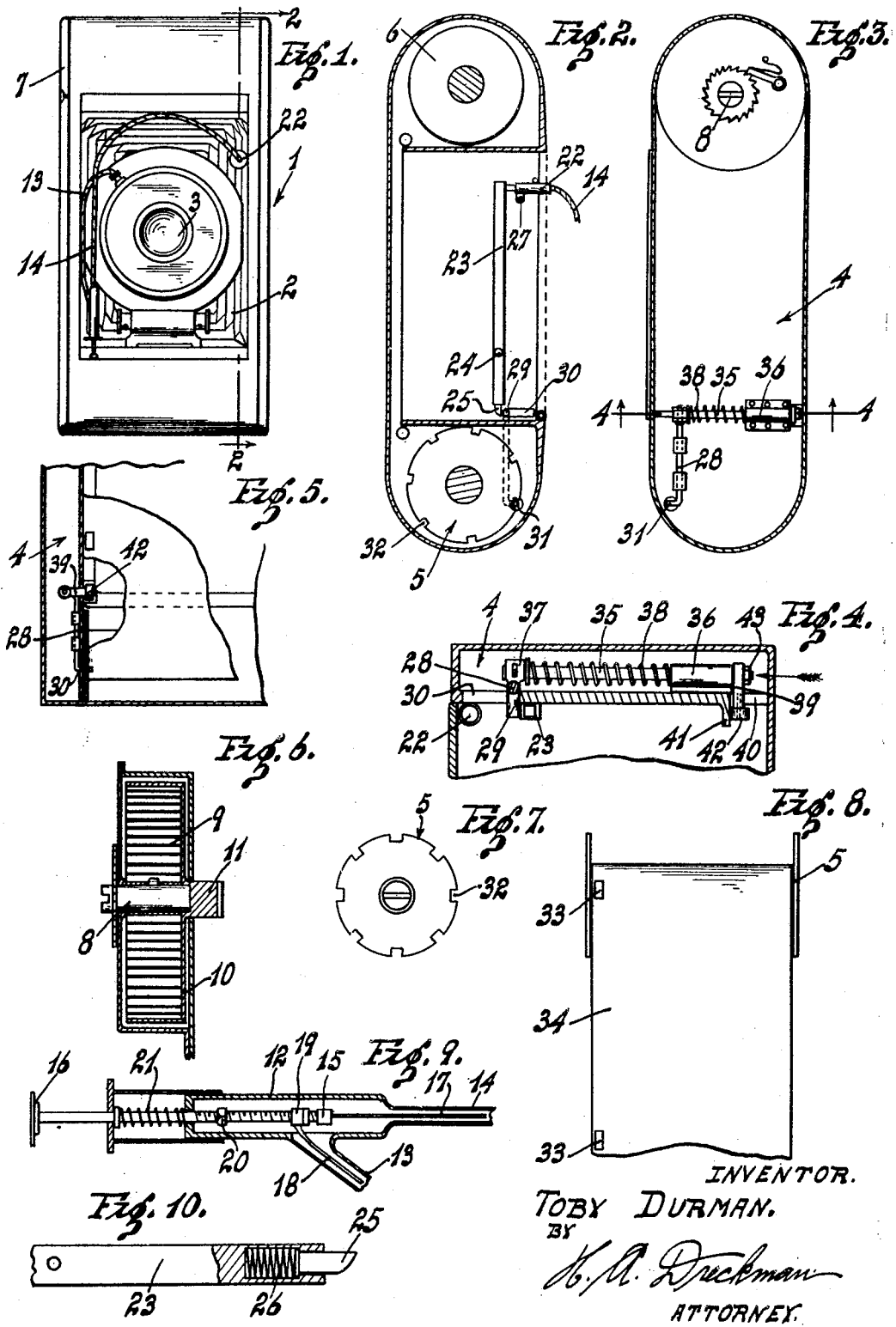
INVENTOR.
TOBY DURMAN.
BY
ATTORNEY.

Patented May 5, 1931

1,803,322

UNITED STATES PATENT OFFICE

TOBY DURMAN, OF SIGNAL HILL, CALIFORNIA

AUTOMATIC FILM-WINDING DEVICE

Application filed December 5, 1927. Serial No. 237,744.

This invention relates to a means of automatically winding the film in a camera to replace the one previously used, the winding action occurring either before or after the taking of the picture.

An object of my invention is to provide an automatic film winding device which is simple in construction, and effective in operation. My device consists essentially of a roller cooperating with perforations in the film roll, the roller being so controlled that it will effectively stop the film when it drops into a perforation.

Another object of my invention is to provide an automatic film winding device which is controlled by the shutter actuating mechanism.

A further object is to provide a device of the character stated, which is inexpensive to manufacture, and occupies a minimum of space.

Other objects, advantages and features of invention may appear in the accompanying drawings, the subjoined detailed descriptions, and the appended claims.

In the drawing, Fig. 1 is a front elevation of a camera showing the shutter and winding device controls.

Fig. 2 is a sectional view taken on line 2—2, of Fig. 1.

Fig. 3 is a view taken on the reverse side of the wall shown in Fig. 2.

Fig. 4 is a fragmentary sectional view taken on line 4—4, of Fig. 3.

Fig. 5 is a fragmentary sectional view looking in the direction of the arrow Fig. 4.

Fig. 6 is a transverse sectional view of a winding spring.

Fig. 7 is an end view of the film spool.

Fig. 8 is a plan view of the film and spool showing the film partly unwound therefrom.

Fig. 9 is a longitudinal sectional view of the shutter and film control button.

Fig. 10 is a fragmentary view partly in section of the actuating lever.

Referring more particularly to the drawing, the camera 1, may be of any usual and well known construction, and is here shown as the folded type comprising a bellows compartment 2, and the usual shutter mechanism 3, actuated in the usual manner, the manual control of which will be further described.

In my film actuating device it is necessary to slightly widen the camera in that the compartment 4, extends along one side thereof, and it contains a part of the mechanism. It is of course, understood that this compartment is closed so that no light can enter therein to expose the film. An unused film spool 5, is mounted in the bottom of the camera and the used or exposed film spool 6, is mounted in the top of the camera, all of which is usual and well known in the art. I prefer that the spool 6, should be mounted in the camera through a hinged door 7, on the side of the camera opposite the compartment 4, the reason for this will be described later.

The end of the spool 6, fits into a notch in a shaft 8, mounted adjacent the top of the camera, which shaft is surrounded and engaged by a spiral spring 9, thus tending to rotate the shaft in the direction to roll the film upon the spool 6.

The spring 9, is positioned within a cylinder 10, from which cylinder a trunnion 11, extends, said trunnion projecting through the side of the camera, and is adapted to be engaged by a key to wind up the spring when necessary. The spring 9, creates a constant tension on the film, and in order to stop the film at the correct point, I provide a mechanism which operates upon the spool 5, to release and engage said spool at the proper time.

In a camera of the folding type it is desirable to provide a flexible cable in which a wire is positioned, this wire leading to the shutter mechanism to operate the same and the wire being operable by a finger button. In connection with my mechanism I propose a similar device which comprises a sleeve 12, from which a flexible cable 13 extends to the shutter mechanism, and a flexible cable 14, extends to the film operating mechanism.

A threaded post 15, is positioned in the sleeve 12, and extends from one end thereof, terminating in a button 16. A wire 17, extends from the bottom of the post 15, to the film operating mechanism, and a wire 18, extends through the cable 13, to the shutter operating mechanism, the wire 18, terminating in a ring 19, surrounding the post 15, and a nut 20, screws onto the post and is adapted to engage the ring to actuate the wire 18. Thus it will be seen that as the post 15, is depressed, the film mechanism will be first actuated, and during the last depression of the post, the nut 20, will engage the ring 19, and actuate the shutter operating mechanism to expose the film. A spring 21, positioned in the top of the sleeve 12, engages the post 15, to carry the same back into starting position. The cable 14, terminates in a plunger 22, which plunger is mounted on one wall of the bellows compartment, which is the inner wall of the compartment 4. This plunger engages the upper end of the lever 23, which is pivoted as at 24, to the inner wall of the compartment 4, and is formed with a yielding foot 25, in the bottom thereof, the purpose of which will be further described.

The foot 25, rests against a spring 26, which yieldably holds the same in extended position. To permit folding of the camera it may be necessary to pivot the plunger 22, as at 27, so that it can fold downwardly, and not interfere with the closing of the door. It will now be seen that as the post 15, is depressed, actuating the wire 18, the plunger 22 will be moved inwardly, thus swinging the lever 23 upon its pivot. A trip rod 28, is journaled in suitable bearings in the compartment 4, and is provided with a finger 29, which extends through a slot 30, so as to be engaged by the foot 25, of the lever 23. That is as the lever 23 swings it will engage the finger 29, to rotate the rod 28. The rod 28 is provided at the end opposite the finger 29, with a catch 31, said catch extends through the inner wall of the compartment 4, and engages one of the notches 32, in the spool 5. As the rod 28, rotates, the catch 31, is lifted, thus releasing the spool 5, and permitting the film to move to a new unexposed position for reason of the action of the spring 9, upon the spool 6.

To provide a shut-off or stop for the film, which stop will occur at exactly the right point, I provide perforations or openings 33, along one side of the film 34, which openings are spaced the length of the picture. A stop pin 35, is slidably mounted in a bearing 36, and the end of the pin 35 is pivotally mounted to a boss 37, extending from the rod 28, thus the rod and pin are connected together, and as the rod is rotated, the pin is moved longitudinally. A spring 38, surrounds the rod 35, and bears against a collar pressing against the boss 37, thus tending to urge the post downwardly, and to rotate the rod 28, into the spool engaging position.

An arm 39, is mounted on the end of the pin 35, and extends through an opening 40, over the film 34, which film moves over a bracket, which bracket is usual and well known in camera construction.

A roller 42, is journaled on the end of the arm 39, which roller is adapted to enter the openings 33, thus permitting the pin 35, to move inwardly rotating the rod 28, and permitting the catch 31, to engage the spool 5, and stop its rotation. The arm 39, may be secured to the end of the pin 35, by a nut 43 or the like.

When the catch 31 has been raised as previously described, the pin 35 will be simultaneously moved upwardly thus moving the roller 42 out of the opening 33 in which it rests, and permitting the film 34 to move. The roller 42 rotates over the top of the film and when the next opening 33 comes over the roller, said roller will drop downwardly into the opening, thus permitting the pin 35 to retract under the action of the spring 38, and again move the catch 31, into one of the notches 32, in the spool 5, thus stopping the movement of the film.

Having described my invention, I claim:

1. In combination with a camera including a shutter mechanism, a used film spool, and an unused film spool having notches therein, a spring means engaging said used film spool, trigger means, said trigger means including a rod mounted for rotary movement, a catch on the rod engaging the notches in the unused spool, a film extending between both of said spools, said film having perforations therein, means co-operating with said perforations and controlling said trigger means whereby the trigger is actuated by the perforations; a manual shutter control comprising a sleeve, a rod slidable in the sleeve, a flexible cable extending from the rod to the shutter mechanism, a second cable, slidably mounted on the rod, a shoulder on said rod, said second cable being adapted to be engaged by the shoulder on the rod, an actuating lever to which the said last named cable extends, said lever being adapted to be swung when the rod is depressed and means connecting said lever and trigger means, whereby the trigger means is released when the lever is swung.

2. In combination with a camera including a shutter mechanism, a used film spool, and an unused film spool, a film extending over said spools having perforations therein, a spring means engaging said used film spool, trigger means engaging the unused spool to stop the spool, said trigger means including a rod and a catch on the rod to engage the unused spool, a stop pin slidably mounted in the camera and pivotally connected to said rod, an arm on the stop pin extending over the film and adapted to engage the perforations therein; a spring means urging the stop pin downwardly whereby the rod is rotated to engage the catch with the unused spool when a perforation in the film is reached.

3. In combination with a camera including a shutter mechanism, an unused film spool, a used film spool, a film extending between said spools, spring means engaging the used film spool and tending to rotate the same; a rod journaled in the camera, a catch on the rod adapted to engage the unused film spool to prevent rotation thereof, a stop pin slidably mounted in the camera, an arm on the pin, means securing said pin and rod together, said film having perforations therein, adapted to engage the arm; a spring means urging said pin downwardly when the perforations in the film is reached thereby rotating the rod and engaging the catch to stop the film; a shutter operating mechanism including a sleeve, a rod slidably mounted in the sleeve, a spring means urging the rod upwardly, a wire extending from the rod to the shutter mechanism, a lever pivoted to the camera and adapted to engage the first named rod and rotate the same against the action of the spring means engaging the pin, a second wire slidably mounted on the last named rod and extending to said lever, said second wire being adapted to swing the lever when the last named rod is depressed in the sleeve.

4. In combination with a camera including a shutter mechanism, an unused film spool, a used film spool, a film extending between the said spools, a spring means engaging the used film spool and tending to rotate the same, a rod journaled in one side of the camera, adjacent the unused film spool, said unused film spool having notches formed in one end thereof, a catch depending from the rod and adapted to enter said notches, a lug rising from the rod, a stop pin slidably mounted on the camera, and pivoted to said lug; an arm extending from said stop pin over one edge of the film said film having perforations therein, a roller on the arm adapted to enter said perforations, a spring means engaging the stop pin, tending to urge the same downwardly when a perforation is reached, thereby rotating the rod and engaging the catch, an actuating lever pivoted to the camera, a finger extending from said rod, said lever being adapted to engage the finger to rotate the rod and release the unused film spool, and manual means to swing the said lever.

5. In combination with a camera including a shutter mechanism, an unused film spool, a used film spool, a film extending between said spools, a spring means engaging the used film spool, and tending to rotate the same, a rod journaled in one side of the camera, adjacent the unused film spool, said unused film spool having notches formed in one end thereof, a catch depending from the rod and adapted to enter said notches, a lug rising from the rod, a stop pin slidably mounted on the camera and pivoted to said lug, an arm extending from said stop pin over one edge of the film said film having perforations therein, a roller on the arm adapted to enter said perforations, a spring means engaging the stop pin, tending to urge the same downwardly when a perforation is reached, thereby rotating the rod and engaging the catch, an actuating lever pivoted to the camera, a finger extending from said rod, said lever being adapted to engage the finger to rotate the rod and release the unused film spool, a shutter and lever actuating means comprising a sleeve, a push rod slidably mounted in the sleeve, a spring means urging the push rod upwardly, a wire extending from said push rod to the shutter mechanism, a plunger adjacent the lever, a wire extending from the plunger to the sleeve, said wire being slidably mounted on the push rod, a shoulder on the rod adapted to engage the last named wire whereby the plunger is actuated to swing said lever.

6. In combination with a camera including a shutter mechanism, an unused film spool, a used film spool, spring means engaging the used film spool, a film extending between said spools, and manual means whereby the shutter mechanism is actuated by the spring means engaging the used film spool and tending to rotate the same, a rod journaled in the camera, a catch on the rod adapted to engage the unused film spool to prevent rotation thereof, a stop pin slidably mounted in the camera, an arm on the pin, means securing said rod and pin together, said film having perforations therein adapted to be engaged by the arm, spring means urging said pin downwardly when the perforations in the film are reached thereby rotating the rod and engaging the catch to stop the film, a lever pivoted to the camera and adapted to engage the first named rod to rotate the same against the action of the spring means engaging the pin, and means engaging said lever to swing the same, said last named means being operable by the shutter operating means.

In testimony whereof I affix my signature.
TOBY DURMAN.